US011308731B2

(12) United States Patent
Harron et al.

(10) Patent No.: US 11,308,731 B2
(45) Date of Patent: *Apr. 19, 2022

(54) IDENTIFYING VIDEO CONTENT VIA COLOR-BASED FINGERPRINT MATCHING

(71) Applicant: Roku, Inc., San Jose, CA (US)

(72) Inventors: Wilson Harron, Berkeley, CA (US); Markus K. Cremer, Orinda, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,124

(22) Filed: Nov. 22, 2019

(65) Prior Publication Data

US 2020/0089934 A1 Mar. 19, 2020

Related U.S. Application Data

(63) Continuation of application No. 15/286,787, filed on Oct. 6, 2016, now Pat. No. 10,503,956, which is a (Continued)

(51) Int. Cl.
*G06K 9/00* (2022.01)
*G06V 40/12* (2022.01)
(Continued)

(52) U.S. Cl.
CPC ........ *G06V 40/1365* (2022.01); *G06F 16/783* (2019.01); *G06V 10/56* (2022.01);
(Continued)

(58) Field of Classification Search
None
See application file for complete search history.

(56) References Cited

U.S. PATENT DOCUMENTS 4,589,140 A 5/1986 Bishop et al.
5,828,809 A 10/1998 Chang et al.
(Continued)

OTHER PUBLICATIONS

Choi, "Realtime on-road vehicle detection with optical flows and Haar-like feature detectors," CS Dept., Univ. Illinois Urbana-Champaign, Urbana, IL, USA, Tech. Rep., 2006. (Year: 2006).*

(Continued)

*Primary Examiner* — Feng Niu
(74) *Attorney, Agent, or Firm* — McDonnell Boehnen Hulbert & Berghoff LLP

(57) ABSTRACT

Systems and methods of identifying unknown video content are described. An example method may include receiving a first fingerprint and a second fingerprint. The first fingerprint may be a color-based fingerprint derived from colors in a portion of the unknown video content, and the second fingerprint may be at least partially based on a feature other than the colors of the unknown video content. A reference database of reference fingerprints may then be queried using one of the first fingerprint or the second fingerprint to obtain a candidate group of fingerprints. The candidate group of fingerprints may then be queried using the other of the first fingerprint and the second fingerprint to identify at least one query fingerprint. The unknown video content may then be identified using the at least one query fingerprint.

20 Claims, 9 Drawing Sheets

Related U.S. Application Data continuation of application No. 14/061,043, filed on Oct. 23, 2013, now Pat. No. 9,465,995.

(51) Int. Cl.
  *G06F 16/783* (2019.01)
  *G06V 10/56* (2022.01)
  *G06V 20/40* (2022.01)
  *G06V 40/50* (2022.01)
  *G06V 10/75* (2022.01)

(52) U.S. Cl.
  CPC ............. *G06V 20/46* (2022.01); *G06V 20/48* (2022.01); *G06V 40/50* (2022.01); *G06V 10/758* (2022.01)

(56) References Cited

U.S. PATENT DOCUMENTS

| | | | |
|---|---|---|---|
| 6,282,317 B1 | 8/2001 | Luo et al. | |
| 7,505,610 B2 * | 3/2009 | Milne | G06K 9/6293 |
| | | | 382/116 |
| 8,285,718 B1 | 10/2012 | Ong et al. | |
| 8,364,703 B2 * | 1/2013 | Ramanathan | G06K 9/4671 |
| | | | 707/769 |
| 8,433,175 B2 | 4/2013 | Shakya et al. | |
| 8,582,802 B2 * | 11/2013 | Clippard | G06K 9/6212 |
| | | | 382/100 |
| 8,666,152 B1 | 3/2014 | Ramanathan et al. | |
| 8,667,526 B2 | 3/2014 | Afram et al. | |
| 8,688,731 B2 * | 4/2014 | Ramanathan | G06K 9/4671 |
| | | | 707/769 |
| 8,868,917 B2 | 10/2014 | Conwell | |
| 9,146,990 B2 | 9/2015 | Scherf et al. | |
| 9,195,663 B2 * | 11/2015 | Ramanathan | G06F 16/2255 |
| 9,465,995 B2 * | 10/2016 | Harron | G06K 9/4652 |
| 9,471,674 B2 * | 10/2016 | Ramanathan | G06K 9/4671 |
| 9,620,168 B1 | 4/2017 | Townsend et al. | |
| 9,898,593 B2 | 2/2018 | Sun et al. | |
| 9,924,870 B2 | 3/2018 | Visvanathan et al. | |
| 10,387,482 B1 * | 8/2019 | Ramanathan | G06F 16/2255 |
| 10,503,956 B2 * | 12/2019 | Harron | G06K 9/4652 |
| 10,579,668 B1 * | 3/2020 | Ramanathan | G06F 16/2255 |
| 10,593,040 B2 * | 3/2020 | Zouridakis | A61B 5/444 |
| 2002/0131641 A1 | 9/2002 | Luo et al. | |
| 2004/0237102 A1 | 11/2004 | Konig et al. | |
| 2005/0093880 A1 * | 5/2005 | Kim | G06K 9/4652 |
| | | | 345/589 |
| 2005/0238238 A1 | 10/2005 | Xu et al. | |
| 2006/0072829 A1 * | 4/2006 | Cieplinski | G06K 9/4652 |
| | | | 382/224 |
| 2006/0103732 A1 | 5/2006 | Bateman | |
| 2006/0153296 A1 | 7/2006 | Deng | |
| 2006/0187358 A1 | 8/2006 | Lienhart et al. | |
| 2007/0230801 A1 * | 10/2007 | Sinclair | G06F 16/5838 |
| | | | 382/224 |
| 2008/0140616 A1 | 6/2008 | Encina et al. | |
| 2008/0212899 A1 * | 9/2008 | Gokturk | G06V 10/56 |
| | | | 382/305 |
| 2009/0077580 A1 | 3/2009 | Konig et al. | |
| 2009/0083228 A1 | 3/2009 | Shatz et al. | |
| 2009/0268096 A1 | 10/2009 | Lin et al. | |
| 2009/0276468 A1 | 11/2009 | Menon et al. | |
| 2009/0324199 A1 | 12/2009 | Haitsma et al. | |
| 2010/0048242 A1 | 2/2010 | Rhoads et al. | |
| 2010/0061587 A1 | 3/2010 | Gupta et al. | |
| 2010/0278421 A1 * | 11/2010 | Peters | H04N 9/73 |
| | | | 382/162 |
| 2010/0306193 A1 * | 12/2010 | Pereira | G06V 20/48 |
| | | | 707/728 |
| 2011/0085697 A1 * | 4/2011 | Clippard | G06K 9/6212 |
| | | | 382/100 |
| 2011/0122255 A1 | 5/2011 | Haritaoglu | |
| 2011/0158519 A1 * | 6/2011 | Zhao | G06K 9/4652 |
| | | | 382/165 |
| 2011/0187900 A1 | 8/2011 | Park et al. | |
| 2011/0225153 A1 | 9/2011 | Haseyama | |
| 2011/0229031 A1 | 9/2011 | Ranganathan | |
| 2011/0235902 A1 * | 9/2011 | Chittar | G06V 10/50 |
| | | | 382/162 |
| 2011/0286628 A1 | 11/2011 | Goncalves et al. | |
| 2012/0095958 A1 | 4/2012 | Pereira et al. | |
| 2012/0117473 A1 | 5/2012 | Han et al. | |
| 2012/0117584 A1 | 5/2012 | Gordon | |
| 2012/0141019 A1 * | 6/2012 | Zhang | G06V 20/35 |
| | | | 382/159 |
| 2012/0215789 A1 * | 8/2012 | Ramanathan | G06K 9/4671 |
| | | | 707/747 |
| 2012/0237082 A1 * | 9/2012 | Sengupta | G06V 20/52 |
| | | | 382/103 |
| 2012/0268655 A1 | 10/2012 | Macinnis et al. | |
| 2013/0108119 A1 | 5/2013 | Ptucha | |
| 2013/0136349 A1 | 5/2013 | Lings et al. | |
| 2013/0251253 A1 * | 9/2013 | Nakagome | G06F 16/5854 |
| | | | 382/165 |
| 2013/0326573 A1 | 12/2013 | Sharon et al. | |
| 2014/0036054 A1 * | 2/2014 | Zouridakis | A61B 5/0077 |
| | | | 348/77 |
| 2014/0201772 A1 | 7/2014 | Neumeier et al. | |
| 2014/0270362 A1 * | 9/2014 | Najafi Shoushtari | G06K 9/6204 |
| | | | 382/103 |
| 2015/0110340 A1 | 4/2015 | Harron et al. | |
| 2015/0154456 A1 * | 6/2015 | Pau | G06V 10/462 |
| | | | 382/201 |
| 2015/0339817 A1 * | 11/2015 | Kuriyama | G06K 9/6267 |
| | | | 348/71 |
| 2015/0365716 A1 | 12/2015 | Fonseca, Jr. et al. | |
| 2018/0077445 A1 | 3/2018 | Puntambekar et al. | |
| 2019/0243852 A1 * | 8/2019 | Ramanathan | G06F 16/2255 |
| 2019/0251114 A1 * | 8/2019 | Pereira | G06F 16/7847 |
| 2019/0251115 A1 * | 8/2019 | Ramanathan | G06F 16/951 |
| 2019/0251116 A1 * | 8/2019 | Ramanathan | G06K 9/4671 |

OTHER PUBLICATIONS

Lienhart et al., "An extended set of Haar-like features for rapid object detection", ICIP02, pp. I: 900-903, 2002 (Year: 2002).*

Messom et al., "Fast and Efficient Rotated Haar-like Features Using Rotated Integral Images", Australian Conference on Robotics and Automation (ACRA2006), pp. 1-6, 2006 (Year: 2006).*

Nikolaidis et al., "Still image and video fingerprinting." In 2009 Seventh International Conference on Advances in Pattern Recognition, pp. 3-8. IEEE, 2009. (Year: 2009).*

Bay et al., "Surf: Speeded up robust features." In European conference on computer vision, pp. 404-417. Springer, Berlin, Heidelberg, 2006. (Year: 2006).*

"U.S. Appl. No. 14/061,043, Examiner Interview Summary dated Jun. 20, 2016", 3 pgs.

"U.S. Appl. No. 14/061,043, Non Final Office Action dated Mar. 23, 2016", 27 pgs.

"U.S. Appl. No. 14/061,043, Non Final Office Action dated Jul. 6, 2015", 26 pgs.

"U.S. Appl. No. 14/061,043, Notice of Allowance dated Aug. 26, 2016", 11 pgs.

"U.S. Appl. No. 14/061,043, Response filed Jun. 23, 2016 to Non Final Office Action dated Mar. 23, 2016", 11 pgs.

"U.S. Appl. No. 14/061,043, Response filed Nov. 3, 2015 to Non Final Office Action dated Jul. 6, 2015", 15 pgs.

Wu, et al., "Practical Elimination of Near-Duplicates from Web Video Search", Proceedings of 15th ACM International Conference on Multimedia, (2007), 218-227 pgs.

Sarkar, Anindya, et al., "Video Fingerprinting: Features for Duplicate and Similar Video Detection and Query-based Video Retrieval", SPIE—Multimedia Content Access: Algorithms and Systems II, San Jose, California, Jan. 2008, 12 pages.

(56) References Cited

OTHER PUBLICATIONS

Azizyan, Martin, et al., "SurroundSense: Mobile Phone Localization via Ambience Fingerprinting," MobiCom '09, Sep. 2009, Beijing, China, 12 pages.

* cited by examiner

IDENTIFYING VIDEO CONTENT VIA COLOR-BASED FINGERPRINT MATCHING

CROSS-REFERENCE TO RELATED APPLICATIONS

This application is a continuation of U.S. application Ser. No. 15/286,787, filed Oct. 6, 2016, which is a continuation of U.S. application Ser. No. 14/061,043, filed Oct. 23, 2013. The foregoing applications are incorporated herein by reference.

TECHNICAL FIELD

The subject matter disclosed herein generally relates to the processing of data. Specifically, the present disclosure addresses systems and methods to identify video content using a digital fingerprint.

BACKGROUND

Typically, people watch video content, such as television shows, advertisements, movies, video clips, and so on, via devices that receive a transmission from a content source. For example, a broadcaster (e.g., HBO® or CNN®), a web server (e.g., YouTube®), a peer-to-peer source (e.g., another device), and so on, streams or otherwise transmits video content to various devices capable of presenting the video content, such as televisions and associated set-top boxes, computing and/or mobile devices and associated media players or browsers, and so on.

BRIEF DESCRIPTION OF THE DRAWINGS

Some embodiments are illustrated by way of example and not limitation in the figures of the accompanying drawings.

DETAILED DESCRIPTION

Overview

Figure 1:
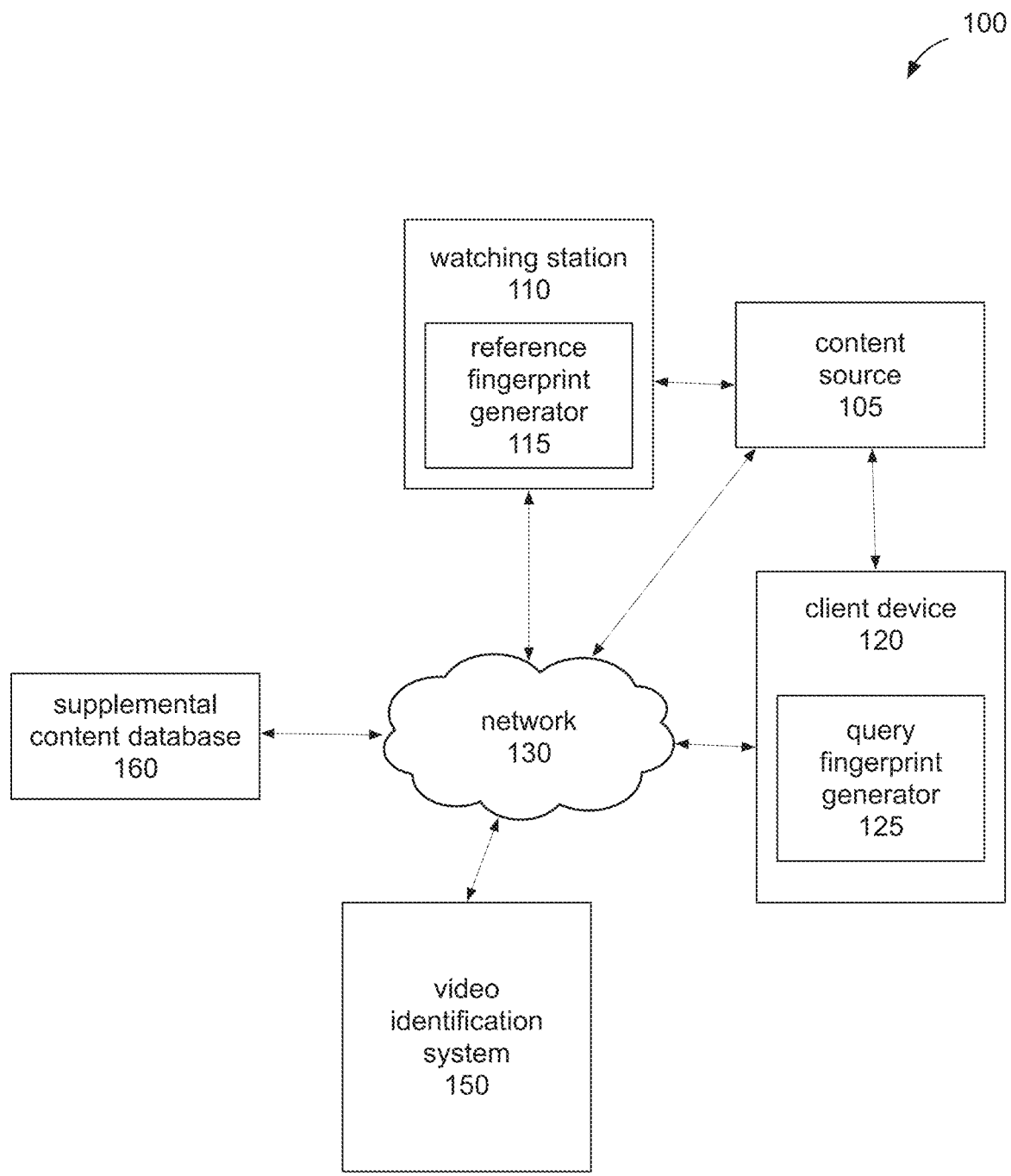
FIG. 1 is a network diagram illustrating a network environment suitable for identifying video content using digital fingerprint matching, according to some example embodiments.

Example methods and systems for identifying video content via fingerprint matching, such as via the matching of color-based fingerprints (e.g., values of fingerprints), are described. In an example embodiment, a first fingerprint and a second fingerprint is accessed or received. It shall be noted that a similar approach can be taken using more than two fingerprints derived from the same portion of content, each fingerprint extracted using fundamentally different properties of the content, where each fingerprint can be used to reduce the search space and producing a narrowing list of candidates. Examples for fundamentally different features for video content would be color-based features, luminance based features, optical flow-based features, or point-of-interest-based features such as scale-invariant feature transform (SIFT) image features or speed up robust features (SURF). In the following, as an example embodiment and without limiting the scope of the invention, it will be assumed that the first fingerprint may be a color-based fingerprint derived from colors in a portion of the unknown video content, and the second fingerprint may be at least partially based on a feature other than the colors of the unknown video content. A reference database of reference fingerprints is then queried using one of the first fingerprint or the second fingerprint to obtain a candidate group of fingerprints. Thereafter, in an example embodiment, the candidate group of fingerprints is queried using the other of the first fingerprint and the second fingerprint to identify at least one query fingerprint. This in turn identifies the unknown video that is associated with the at least one query fingerprint.

Alternatively, two reference databases can be used, the first database containing fingerprints of the first type of fingerprint, the second database containing fingerprints of the second type of fingerprint. Both reference databases may be queried with the respective query fingerprint, which will yield candidate sets. In a subsequent step, the candidate sets may be compared to each other, and the content item associated with a fingerprint in both candidate sets, representing the same spatio-temporal position within the content item (e.g. a specific set of frames corresponding to a specific time span within a video), may be considered a match.

In an example embodiment, the second fingerprint is a luminance-based fingerprint derived from luminance in the unknown video content. In an example embodiment, the reference database may be queried with the first fingerprint to obtain the candidate group of fingerprints, and the candidate group of fingerprints is then queried with the second fingerprint to identify the at least one query fingerprint. Alternatively, the reference database is queried with the second fingerprint to obtain the candidate group of fingerprints, and the candidate group of fingerprints is then queried with the first fingerprint to identify the at least one query fingerprint.

The first and the second fingerprints may be associated with one or more patches of the unknown video content using an integral image technique that includes a value based on multiple colors of a patch of a frame of the unknown video content. Various queries of a database of reference fingerprints may then be performed using one, some, or all of the values in order to identify the unknown video content. For example, the systems and methods may query the database with a color-based fingerprint to determine a candidate group of matching reference fingerprints, and then query the candidate group with patch-based values to select the query fingerprint to query the reference database (or any other database) to identify a corresponding reference fingerprint. Metadata associated with the corresponding reference fingerprint may then identify the unknown content and/or a certain position or location within the content.

In the following description, for purposes of explanation, numerous specific details are set forth to provide a thorough understanding of example embodiments. It will be evident to one skilled in the art, however, that the present subject matter may be practiced without these specific details.

Example Network Environment

FIG. 1 is a network diagram illustrating a network environment 100 suitable for identifying video content via digital fingerprint matching, according to some example embodiments.

The network environment 100 may include a watching station 110 that receives video and other multimedia content from a content source 105, such as a broadcaster, web server, and so on. For example, the content source 105 may be a broadcaster, such as television station or television network, which streams or transmits media over a television channel to the watching station 110, and/or a web service, such as a website, that streams or transmits media over a network 130 to the watching station 110. The watching station 110 includes a reference fingerprint generator 115 that generates reference fingerprints of video content received from the content source 105.

In addition or instead, one or more client devices 120 may also receive the video and other multimedia content from the content source 105, such as via a broadcast channel and/or over the network 130. The client devices 120 and the watching station 110 may include televisions, set-top boxes, laptops and other personal computers, tablets and other mobile devices, gaming devices, and other devices capable of receiving and presenting a stream of video and/or other multimedia content to a viewer.

In some example embodiments, the client device 120 may include a tuner configured to receive a stream of video content and play the stream of video content by processing the stream and outputting information (e.g., digital or analog) usable by a display of the client device 120 to present the video content to a viewer or user associated with the client device 120. The client device 120 may also include a display or other user interface configured to display the processed stream of video content. The display may be a flat-panel screen, a plasma screen, a light emitting diode (LED) screen, a cathode ray tube (CRT), a liquid crystal display (LCD), a projector, a touch screen of a mobile device, and so on.

The network 130 may be any network that enables communication between devices, such as a wired network, a wireless network (e.g., a mobile network), and so on. The network 130 may include one or more portions that constitute a private network (e.g., a cable television network or a satellite television network), a public network (e.g., over-the-air broadcast channels or the Internet), and so on.

In some example embodiments, a video identification system 150 communicates with the watching station 110 and the client device 120 over the network 130. The video identification system 150 may receive a query fingerprint generated by the query fingerprint generator 125 of the client device 120. For example, the fingerprint may be derived from a frame or block of frames within the video content. The query fingerprint generator 125 may query an index of known reference fingerprints, for example, generated by the reference fingerprint generator 115 of the watching station 110, in order to identify the video content by matching the query fingerprint with one or more reference fingerprints.

Upon identifying the video content, the video identification system 150 may return a content identifier for supplemental content (e.g., metadata, event-based information, and so on) associated with the video content analysed or identified as being displayed on the client device 120. The supplemental content may be provided in one or more supplemental content databases 160. Using the content identifier, the client device 120 may access the supplemental content from the database 160 and present the supplemental content along with playing video content. For example the client device 120 may access and present supplemental content from the database 160, such as listing or guide information for a broadcast channel, metadata associated with playing video content, information associated with playing video content, and so on.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 7. As used herein, a "database" is a data storage resource and may store data structured as a text file, a table, a spreadsheet, a relational database, a triple store, or any suitable combination thereof. Moreover, any two or more of the machines illustrated in FIG. 1 may be combined into a single machine, and the functions described herein for any single machine may be subdivided among multiple machines.

Furthermore, any of the modules, systems, and/or generators may be located at any of the machines, databases, or devices shown in the FIG. 1. For example, the video identification system 150 may include the query fingerprint generator 125, frames of video content from the client device 120, and generate the query fingerprints using the included query fingerprint generator 125, among other configurations.

Examples of Identifying Video Content

As described herein, in some example embodiments, the systems and methods described herein utilize fingerprints of video content to identify the video content. In an example embodiment, fingerprints based on color features in a portion of video content are used to identify a candidate set of fingerprints. One or more fingerprints based on other features (e.g., features that may not be color-based) may then be used to narrow down the set of potential fingerprints in a reference database. The reference fingerprints may then identify the video content and provide metadata and other related information pertinent to, or associated with, the video content.

Figure 2:
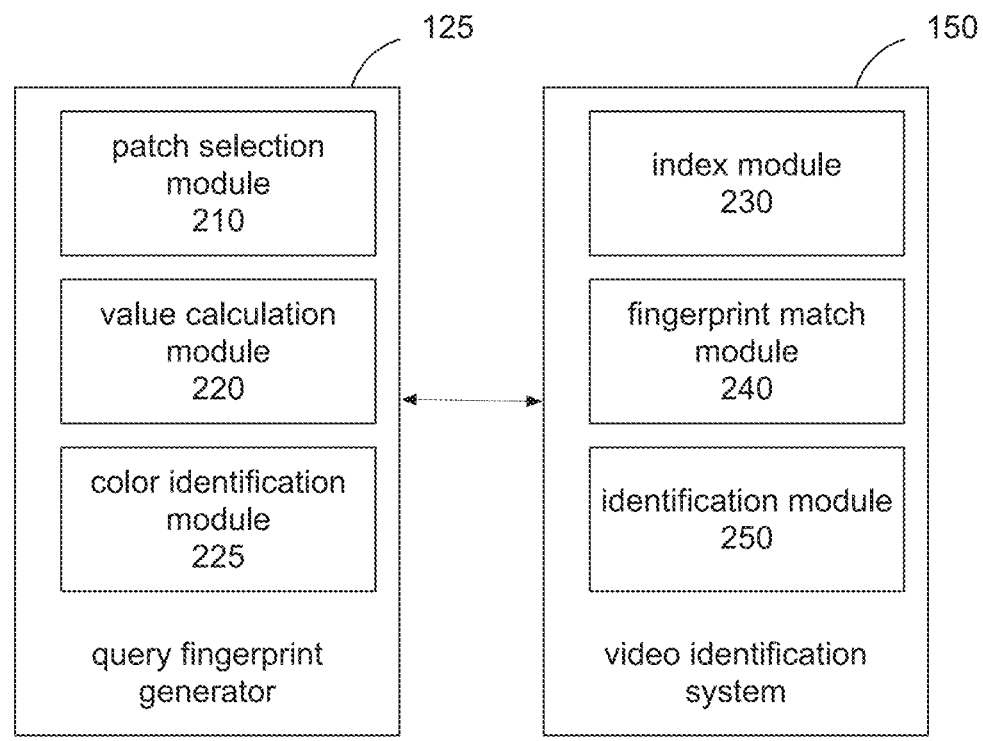
FIG. 2 is a block diagram illustrating components of a query fingerprint generator and a video identification system, according to some example embodiments.

FIG. 2 is a block diagram illustrating components of a video identification system 150 and a query fingerprint generator 125, according to some example embodiments. The query fingerprint generator 125 of the client device 120 (or, the reference fingerprint generator 115 of the watching station 110) may optionally include a patch selection module 210, a value calculation module 220, and a color identification module 225, all configured to communicate with each other (e.g., via a bus, shared memory, or a switch). The video identification system 150 is shown by way of example to also include an index module 230, a fingerprint match module 240, and an identification module 250, all configured to communicate with each other (e.g., via a bus, shared memory, or a switch). The patch selection module 210 may select one or more patches in a frame of video content, the value calculation module 220 may calculate the value of a fingerprint (e.g., using a hash function) from a selected patch, and the color identification module may identify colors in the patch for calculating a further color-based fingerprint.

One or more of the modules described herein may be implemented using hardware (e.g., a processor of a machine) or a combination of hardware and software. Moreover, any two or more of these modules may be combined into a single module, and the functions described herein for a single module may be subdivided among multiple modules.

In some example embodiments, the query fingerprint generator 125 is configured and/or programmed to generate a query fingerprint of one or more frames of video content captured at the client device 120. For example, the query fingerprint generator 125 may calculate one or more values of patches, such as average luminance of a patch, optical flow between subsequent frames within a patch, Haar-like features (e.g. edge-based features), regions, portions, and/or other aspects of one or more frames within the video content, and one or more color-based values (e.g., dominant colors or color palettes) within one or more frames of the video content. For example, a patch may be a portion of a frame having various different geometries, a Haar-like feature set, and so on. In some example embodiments, some or all captured patches may each have a different scale and be at a different location within a frame, among other things. Thus, multiple fingerprints may be generated wherein at least two fingerprints are based on different features of a portion of the video content (e.g., one fingerprint may be based on a particular patch and another fingerprint may be based on color features or characteristics).

The query fingerprint generator 125 (and the reference fingerprint generator 115) may generate and/or creates fingerprints for identifying unknown video content from one or more frames within the content. The video content received by the client device 120 (or different client devices) may be in different formats and sample rates. Accordingly, in an example embodiment, the query fingerprint generator 125 may create, for some or all of the frames of the video content, a query fingerprint for each frame that is scale independent and robust to different compression artifacts. In some example embodiments, the query fingerprint generator 125 may combine the query fingerprints of each of the frames to generate a query fingerprint of a block of frames (e.g., multiple frames) of the video content.

The patch selection module 210 may be configured and/or programed to select multiple patches of the video content, such as patches associated with a displayed region of a frame or frames within the video content. The value calculation module 220 may be configured and/programmed to calculate a value for each of the selected multiple patches using an integral image technique. The intregral image technique may calculate the values using a summed area table or other data structure that generates a sum of values in a rectangular area of a region.

For example, the patch selection module 210 may select patches, such as Haar-like features that are commonly used in object detection, of regions of a frame or frames. The value calculation module 220 may utilize the Haar-like features to generate and/or calculate a same value for objects in a frame, such as objects in a visual image of a frame), regardless of the relative size of the object. For example, the value calculation module 220 may generate values by approximating Gaussian filters and their derivatives using a box filter (e.g., an average of a region of the frame), wherein derivatives of the Gaussian filters are created by finding the differences in the box filters.

Figure 3A:
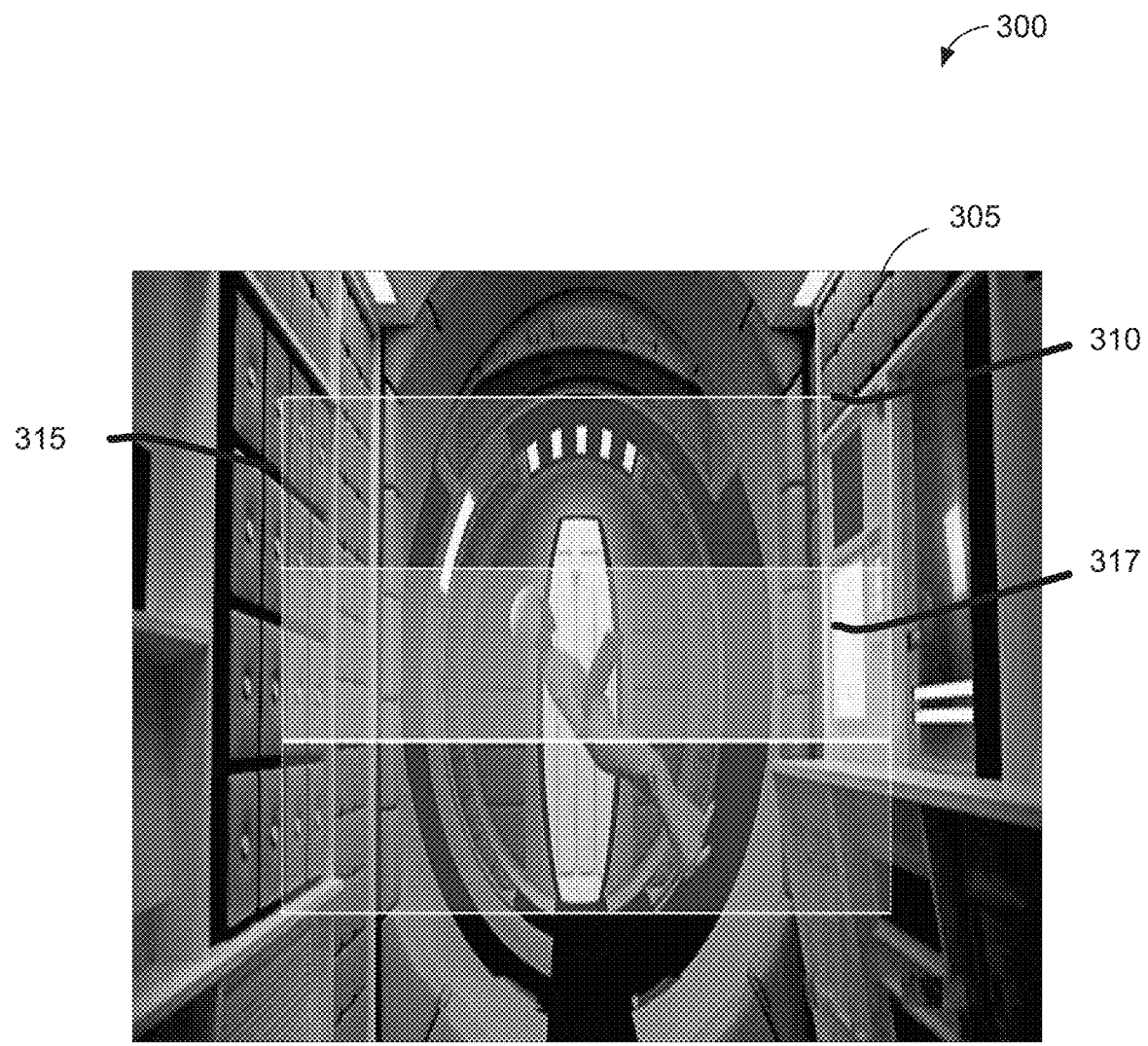
FIGS. 3A-3B are diagrams illustrating example patches applied to a frame of video content.
Figure 3B:
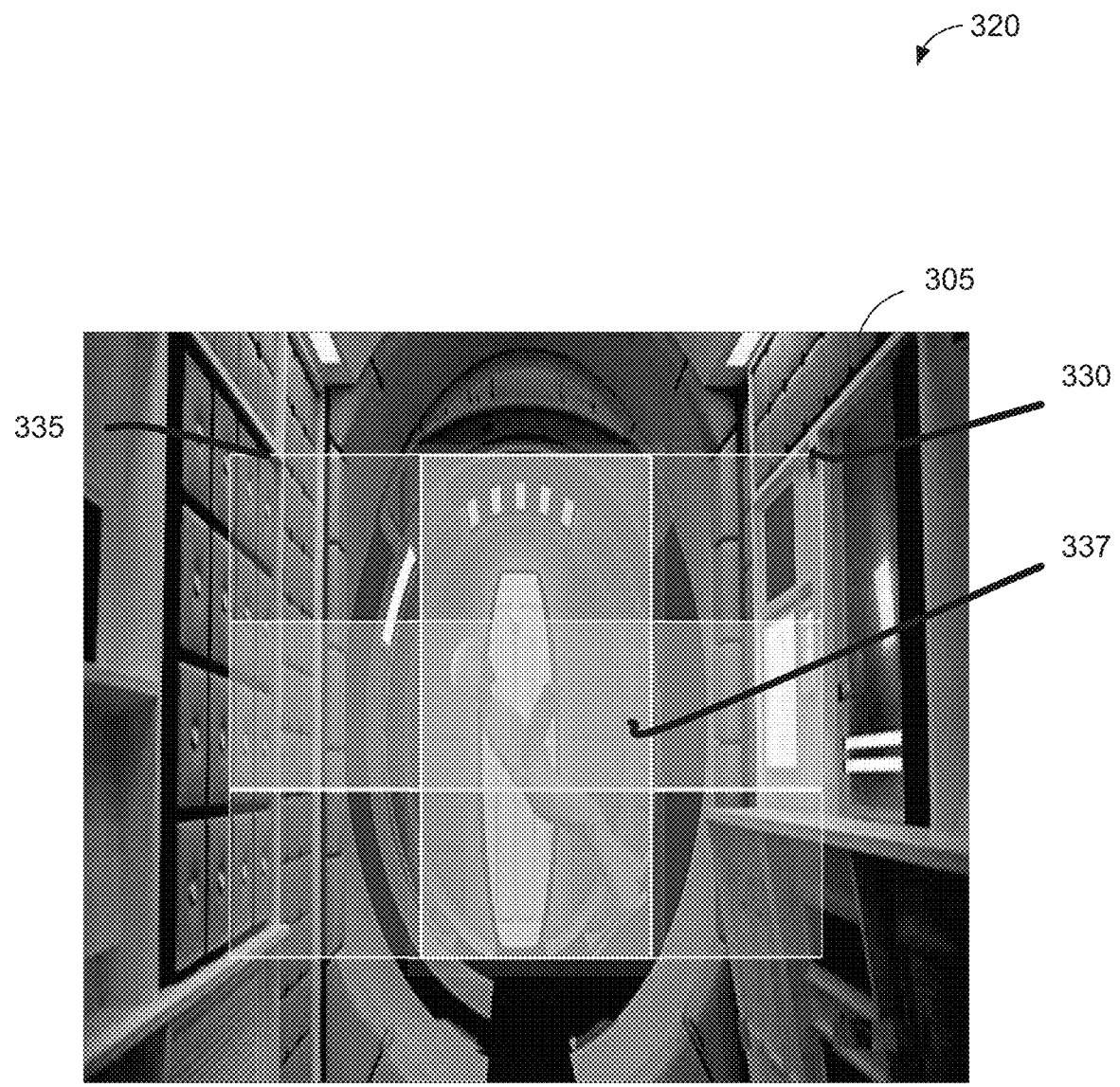

In an example embodiment, the value calculation module 220 may generate a query fingerprint by calculating the values of Haar-like features, or patches, at different scales and in different locations of displayed regions of the frames of video content. FIG. 3A is a diagram 300 illustrating a first patch 310 applied to a frame 305 of video content. The patch 310 includes a middle region 317 and outer regions 315. The value calculation module 220 may calculate a value of the patch 310 by subtracting the middle region 317 from the outer regions 315, in order to determine what region of the patch 310 has a higher amount of energy. FIG. 3B is a diagram 320 illustrating a second, different, patch 330 applied to a frame 305 of video content. The patch 330 includes a middle region 337 and outer regions 335. The value calculation module 220 may calculate a value of the patch 330 by subtracting the middle region 337 from the outer regions 335, in order to determine what region of the patch 330 has a higher amount of energy. It will be appreciated that various other configurations of patches may be determined.

In some example embodiments, the patch selection module 210 selects 32 patches, which include 8 patches for the first 8 regions of a frame and 24 other patches of the left-right and top-bottom features of each region of the frame that results when the frame is divided into a 4×3 grid of 12 regions. Of course, the patch selection module 210 may select a different number of patches or a different configuration of patches.

In some example embodiments, the value calculation module 220 calculates a query (or reference) fingerprint by utilizing integral image techniques. For example, the value calculation module 220 may calculate an integral image, which is a summed image where each pixel is a cumulation of values of the pixels above and to the left, as well as the current pixel. The integral image technique may enable an efficient creation of a fingerprint once an integral image is created, among other benefits. Further efficiencies may be realized by using Integrated Performance Primitive (IPP) libraries (created by Intel®), to create the integral image, and/or by skipping columns and/or rows while generating the integral image in order to process smaller amounts of data, among other things.

Using the integral images, the value calculation module 220 may then calculate values for multiple regions or patches of a frame, such as by using the following formula:

$$FP(i,j,w,h) = I_{int}(i,j) - I_{int}(i+w,j) - I_{int}(i,j+h) + I_{int}(i-w,j+h).$$

In this example, the value calculation module 220 calculates values for the patches or regions of a frame as 16-bit integers, because the range is [−255, 255], which is outside the range of an 8-bit integer. Additionally, the calculated patches or regions of a frame may be weighted by their size, and the calculated values may be floating point values. To capture this information, the values for the fingerprint are scaled to a full 16-bit range. However, in some example embodiments, the values may be quantized to 8-bits, reducing the storage space of a generated fingerprint (e.g., from 64 bytes to 32 bytes), among other things.

The query fingerprint generator 125 may calculate values for colors identified within the frames of video content. For example, the color identification module 225 may be configured to identify one or more colors within the frames of content, such as the 8 or 16 most dominant colors within the frames of content, and the value calculation module 220 may calculate or modify calculated values for the identified colors. It should however be noted that color-based fingerprint need not be limited to patch-based implementations. Accordingly, patch-based fingerprinting is merely provided as an example where color-based fingerprinting may be used.

In an example embodiment, a first fingerprint and a second fingerprint may be accessed or received. For example, the video identification system 150 may receive the first and the second fingerprints from the client device 120). The first fingerprint may be a color-based fingerprint derived from colors in a portion of the unknown video content, and the second fingerprint may be at least partially based on a feature other than the colors of the unknown content. The color identification module 225 may include and/or utilize tools to determine various characteristics of pixels within a frame of content, such as color, a brightness characteristic, a hue characteristic, an intensity characteristic, and so on. In an example embodiment, the color identification module 225 may perform one or more algorithmic processes to determine an amount or percentage for each of the primary colors (e.g., red, green, blue) and/or secondary colors (e.g., magenta, cyan, yellow, white) for the pixels, and map the amounts to a chromaticity model or color histogram in order to determine a number of dominant colors within the frame (or a potion of the frame) of the unknown video content (e.g., the top 8 or 16 dominant colors). The value calculation module 220 may then quantize color codes for the dominant colors in order to calculate and/or determine a value for each of the dominant colors, and/or to modify one or more of the patch-based values associated with a color-based fingerprint representing the frame of video content. Of course, the color identification module 225 may identify other characteristics within a frame of video content, such as luminance, intensity, patterns, gradients, and so on.

Therefore, in some example embodiments, the query fingerprint generator 125 may determine fingerprints for one or more frames of video content (or portions of a frame) that include a first set of values determined based on the colors and/or color characteristics within the frames of video content (e.g., 8 or 16 values determined from the dominant colors within the frames of video content), and a second set of values determined from patches of the frames of video content (e.g, 1-32 values for one or multiple patches, or Haar-like features, of the frames of video content). For example, the query fingerprint generator 125 may determine a fingerprint that is derived from 8 color-based values obtained from the 8 dominant colors of a frame of video content, and 32 patch-based values derived from 32 different patches of the frame of video content.

In some example embodiments, the query fingerprint generator 125 may verify whether one or more frames of video content include pillar bars. Pillar bars are added to a frame of video content when the aspect ratio of a source device is different from an aspect ratio of a display device. For example, in broadcasting, pillars are commonly added when video content having 4:3 aspect ratio is displayed on a television having a 16:9 aspect ratio. In these scenarios, the query fingerprint generator 125 may verify whether frames include pillar bars, as included pillar bars may affect the identification of fingerprints, among other things. Accordingly, in example embodiments, fingerprints may be based on sizing aspects for the video content.

In some example embodiments, in order to identify pillar bars in a frame of video content, the query fingerprint generator 125 may perform a binary search of the calculated integral image to find edges of the image content. For example, the query fingerprint generator 125 may utilize a pillar bar algorithm in order to identify regions of actual video content within a frame, and not within the pillar bars. The following is an example algorithm for finding a left pillar bar in a frame of video content:

```
function FindLeft(w, h)
    x ← w/3
    Δx ← w/3
    while Δx > 1 do
        Δx ← Δx/2
        fp ← FP_{LvR}(0,0,x,h)
        if |fp| < threshold then
            x ← x + Δx
        else
            x ← x − Δx
        end if
    end while
    return x
end function
```

For every iteration, the algorithm may calculate the Haar-like feature (Left vs. Right) from the left edge of the image to the value of x, and when the area is generally flat (e.g., the same image content from Left to Right), then x is moved further into the image; when there is a significant difference, x is moved further out of the image. As the algorithm runs, the amount that x is adjusted by (Δx) is halved, which allows the algorithm to run in log(n) time to find the pillar box (e.g., where n is ⅓ the width or height of the image).

Figure 4:
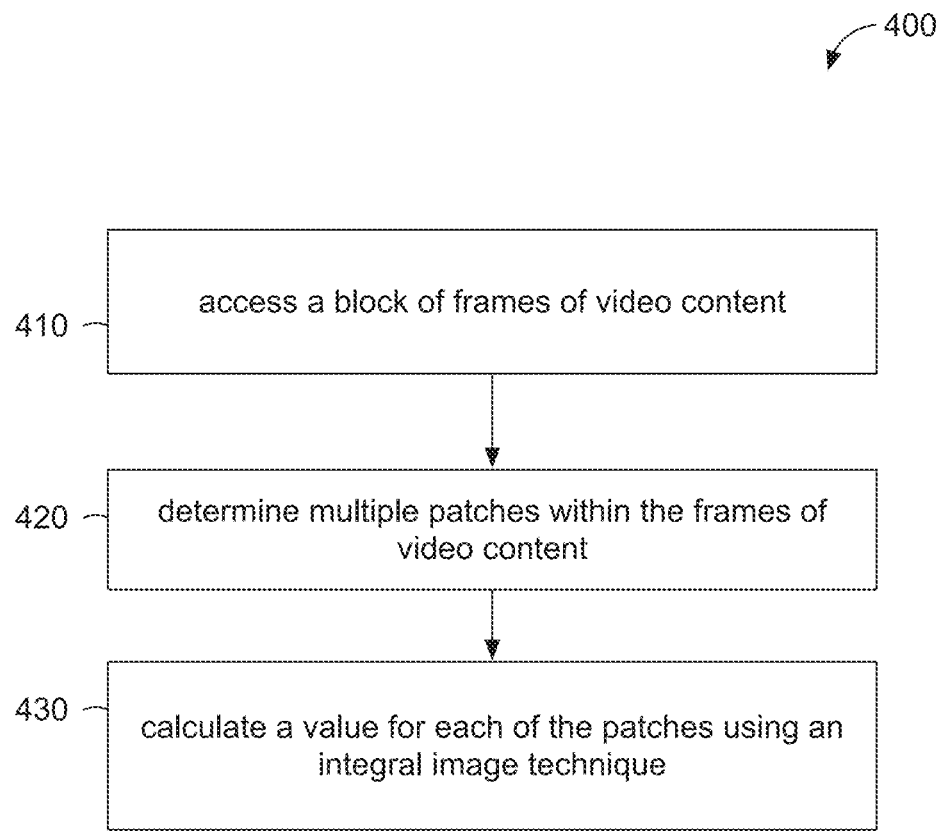
FIG. 4 is a flow diagram illustrating a method, in accordance with an example embodiment, for generating a query fingerprint using multiple patches.

FIG. 4 is a flow diagram illustrating a method 400, in accordance with an example embodiment, for generating a query fingerprint using multiple patches. The method 400 may optionally be performed by the query fingerprint generator 125 and/or the reference fingerprint generator 115 and, accordingly, is described herein merely by way of example with reference thereto. It will be appreciated that the method 400 may be performed on any suitable hardware.

In operation 410, the query fingerprint generator 125 accesses a frame or block of frames of unknown video content. For example, the query fingerprint generator 125 may access one or more frames of the unknown video content currently playing on the client device 120.

In operation 420, the query fingerprint generator 125, or the reference fingerprint generator 115, selects multiple patches of one or more frames of video content that are associated with a displayed region of the video content. For example, the patch selection module 210 may select multiple patches (e.g., 32 patches) of regions of a displayed frame, or patches from multiple frames within a block of frames.

In operation 430, the query fingerprint generator 125 may calculate a value for each of the selected multiple patches using an integral image technique. For example, the value calculation module 220 calculates values for each of the selected regions using the techniques described herein. The calculated values may include values for large regions of a frame, small regions of a frame, regions that overlap (e.g., regions where a smaller patch overlaps a larger patch of a frame), and so on. The value may then define the fingerprint (e.g., the calculation module 220 may calculate a hash value).

Thus, the query fingerprint generator 125 or the reference fingerprint generator 115 may generate a query fingerprint for a single frame and/or a block of frames of video content by selecting patches of regions (e.g. Haar-like features) of the frame or frames, calculating values for each of the selected patches, and performing integral image techniques to generate a query fingerprint using the calculated values for the selected patches, among other things.

Referring back to FIG. 2, the video identification system 150 is shown to include the index module 230, the fingerprint match module 240, and the identification module 250 which are configured and/or programmed to match a query fingerprint to a reference fingerprint derived from known video content. In some example embodiments, the index module 230 is configured and/or programmed to query a database of reference fingerprints of known video content with fingerprints of unknown video content captured at a client device, such as the watching station 110. For example, the index module 230 may query an index stored within a database of the watching station 110, an index stored within the video identification system 150, and so on to identify the unknown video content.

For example, the index module 230 may be configured to query an index of quantized patch values of the known reference fingerprints (fingerprints associated with known video content). For example, the index module 230 may query an index of 8-, 16-, and/or 24-bit numbers that are associated with single frames of the reference fingerprints. The index module 230 may derive the numbers by quantizing one or more patch values of the reference fingerprints. For example, the index module 230 may normalize fingerprint values by their absolute sum, by log normalization, and so on.

The index module 230 may index some or all frames of the reference fingerprints using the best or better correlated values of large regions of the frames. The index module 230 may create an index using highly correlated values of the full frame patches, because the features associated with the best correlated values may represent the remaining patches of a frame, among other things.

For example, when three regions of a frame are the best correlated values, the index module 230 quantizes each of the three values to 8-bits, such as by placing them in an evenly spaced histogram with a maximum and minimum limit, creating a 24-bit number. The index module 230 may then utilize a reference fingerprint index of 24-bit numbers to quickly look up and/or identify frames, because there are only 81 permutations per index to parse when attempting to match fingerprints.

In some example embodiments, the index module 230 is configured to query a database of reference fingerprints associated with frames of known video content using a value associated with the colors within the frame of unknown video content. For example, the index module 230 may query a reference database of color-based values of reference fingerprints with the color-based value or values of the query fingerprint.

In some example embodiments, the fingerprint match module 240 is configured and/or programmed to determine if a query fingerprint matches at least one known reference fingerprint. For example, the fingerprint match module 240 may determine that a query fingerprint matches at least one known reference fingerprint by determining that a similarity between the query fingerprint and at least one of the known reference fingerprints satisfies a predetermined threshold. The threshold may be associated with a Tanimoto distance measurement, a Manhattan distance measurement, and/or other distance measurements associated with matching images or other visual-based content.

For example, the fingerprint match module 240 may compare a query fingerprint to one or more reference fingerprints using the Tanimoto or the Manhattan distance measurements, and determine that the fingerprints match when the comparison indicates that the distance measurement satisfies a predetermined threshold (e.g., is within a certain distance threshold). Of course, the fingerprint match module 240 may utilize other matching techniques in order to determine whether a query fingerprint matches a reference fingerprint, such as Euclidean, Cosine, KL-Divergence and/or Itakura distance measurement techniques, among other distance measurement techniques.

In some example embodiments, the fingerprint match module 240 is configured to determine the value associated with colors within a frame of unknown video content matches a query fingerprint that may then be used to query a database of reference fingerprints. For example, the fingerprint match module 240 may compare color-based values of the query fingerprint to one or more reference fingerprints using the Tanimoto or the Manhattan distance measurements, and determine that the fingerprints match when the comparison indicates that the distance measurement satisfies a predetermined threshold (e.g., is within a certain distance threshold).

In some example embodiments, the video identification system 150 may utilize various different block sizes (e.g., number of frames, or frame rate) of fingerprints when matching a query fingerprint to a reference fingerprint. For example, the reference fingerprint may be set at 5 frames per second (fps), and occupy approximately 560 KB/h of runtime given an 8-bit value (32 bytes/frame) for the fingerprint, and the query fingerprint, which may include offset errors, may be set at 15 fps or higher. In this example, a query of the index may involve querying multiple reference frames (e.g., 3 frames for a reference fingerprint) of the reference fingerprint index.

Thus, in some example embodiments, the video identification system 150 may optimize a match rate for matching a query fingerprint to a reference fingerprint by modifying the block sizes of the fingerprints. For example, fingerprint match module 240 may match a query fingerprint to one second of reference video content, 0.5 second of reference video content, and so on. Upon identification of the video content, meta data associated with the video content may be accessed. For example, the identification module 250 may identify the name or title of the video content, a location within the video content currently being presented by the client device 120, a channel or broadcaster providing the video content, and so on.

Figure 5A:
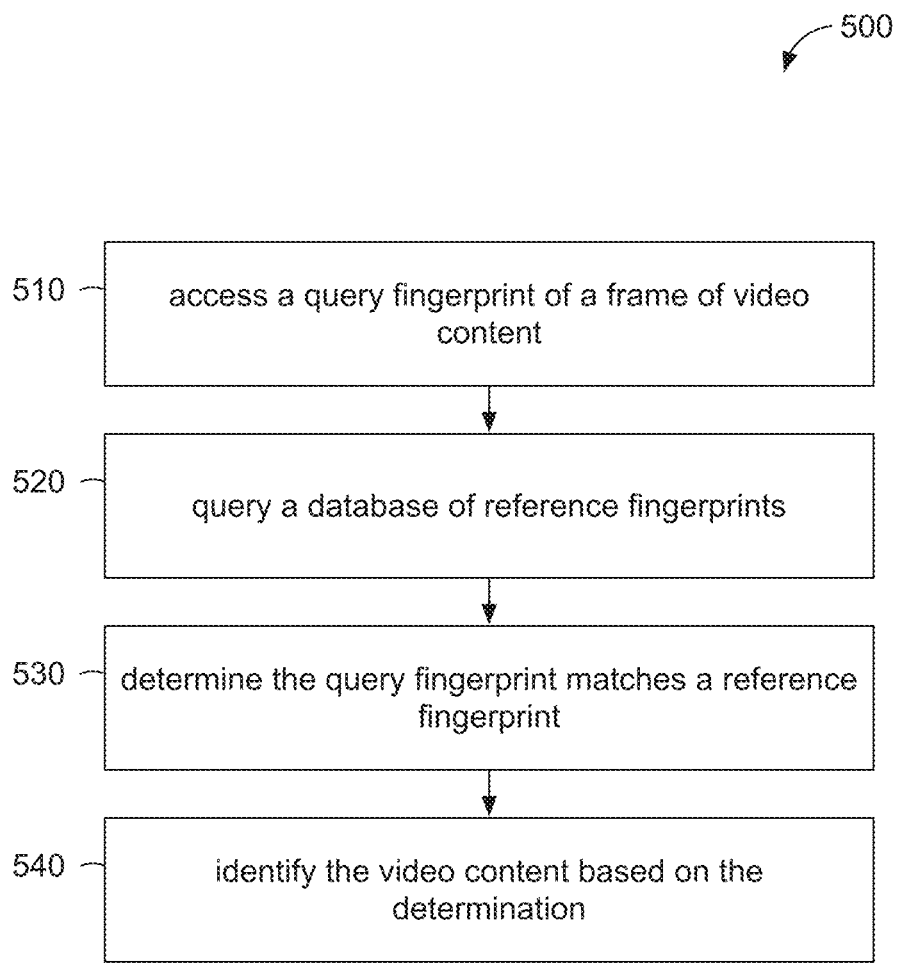
FIG. 5A is a flow diagram of a method, in accordance with an example embodiment, for identifying unknown video content.

FIG. 5A is a flow diagram of a method 500, in accordance with an example embodiment, for identifying unknown video content. The method 500 may be performed by the video identification system 150 and, accordingly, is described herein merely by way of example with reference thereto. It will be appreciated that the method 500 can be performed on any suitable hardware.

In operation 510, the video identification system 150 accesses a query fingerprint of video content that is based on multiple patches of a frame or frames of video content captured at a client device. For example, the video identification system 150 may access and/or receive a query fingerprint from the query fingerprint generator 125 of the client device 120.

In operation 520, the video identification system 150 queries a database of reference fingerprints associated with frames of known video content. For example, the index module 230 may query an index of quantized patch values of the known reference fingerprints.

In operation 530, the video identification system 150 determines the query fingerprint matches at least one of the reference fingerprints. For example, the fingerprint match module 240 may determine that a query fingerprint matches at least one reference fingerprint associated with known video content by determining that a similarity, between the query fingerprint and at least one of the query reference fingerprints, satisfies a predetermined threshold associated with a Tanimoto distance measurement, a Manhattan distance measurement, and/or other distance measurements associated with matching images or other visual-based content.

In some example embodiments, the video identification system 150 may determine that two or more query fingerprints match two or more reference fingerprints by using various distance measurement techniques, among other things. For example, the video identification system 150 may identify video content based on a match of multiple fingerprints. The two or more fingerprints may be a color-based fingerprint and a fingerprint at least partially based on a feature other than the color.

In operation 540, the video identification system 150 identifies the video content captured at the client device based on the determination that the query fingerprint matches at least one of the reference fingerprints. For example, the identification module 250 may identify the name or title of the video content, such as the name of a movie, television program, video clip, video game, and so on.

As described herein, in some example embodiments, the systems and methods may compare fingerprints that include values derived and/or determined from color characteristics of frames of video content in order to identify the video content. In an example embodiment, the color-based fingerprint may at least reduce a number of candidate fingerprints that may correspond to unknown video content.

Figure 5B:
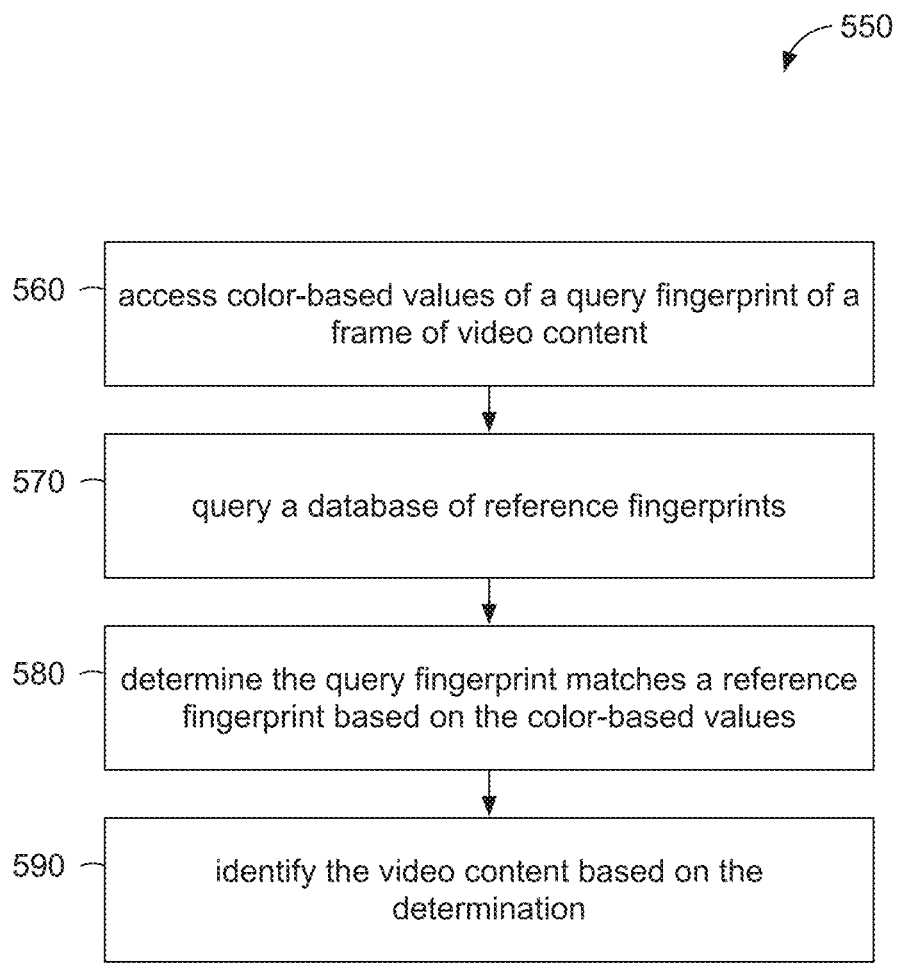
FIG. 5B is a flow diagram of a method, in accordance with an example embodiment, for identifying unknown video content based on a match of color-based digital fingerprints.

FIG. 5B is a flow diagram of a method 550, in accordance with an example embodiment, for identifying unknown video content based on a match of color-based digital fingerprints. The method 550 may be performed by the video identification system 150 and, accordingly, is described herein merely by way of example with reference thereto. It will be appreciated that the method 550 may be performed on any suitable hardware.

In operation 560, the video identification system 150 accesses color-based values of a query fingerprint of video content within a frame or frames of video content captured at a client device. For example, the video identification system 150 may access and/or receive color values of a query fingerprint from the query fingerprint generator 125 of the client device 120. In an example embodiment, a first fingerprint and a second fingerprint is received. The first fingerprint may be a color-based fingerprint derived from colors in a portion of the unknown video content, and the second fingerprint may be at least partially based on a feature other than the colors of the unknown content.

In operation 570, the video identification system 150 queries a database of reference fingerprints associated with frames of known video content. For example, the index module 230 may query an index of quantized color values of the known reference fingerprints.

In operation 580, the video identification system 150 determines if the color-based values of the query fingerprint match at least one of the reference fingerprints. For example, the fingerprint match module 240 may determine that a query fingerprint matches at least one known reference fingerprint by determining that a similarity between the color-based values of the query fingerprint and at least one of the query reference fingerprints satisfies a predetermined threshold associated with a Tanimoto distance measurement, a Manhattan distance measurement, and/or other distance measurements associated with matching images or other visual-based content. In an example embodiment, a reference database is queried using one of the first fingerprint or the second fingerprint to obtain a candidate group of fingerprints. Thereafter the candidate group of fingerprints may be queried using the other of the first fingerprint and the second fingerprint to identify at least one query fingerprint. For example, the reference database may be queried with the first fingerprint to obtain the candidate group of fingerprints, and the candidate group of fingerprints may then be queried with the second fingerprint to identify the at least one query fingerprint. Alternatively, the reference database may be queried with the second fingerprint to obtain the candidate group of fingerprints, and the candidate group of fingerprints is then queried with the first fingerprint to identify the at least one query fingerprint. In an example embodiment, the query fingerprint may then be used to query a database to find a matching fingerprint that identifies the unknown video content.

Returning to the method 550, in operation 590, the video identification system 150 identifies the video content captured at the client device based on the determination that the color-based values of the query fingerprint match at least one of the reference fingerprints. For example, the identification module 250 may identify the name or title of the video content, such as the name of a movie, television program, video clip, video game, and so on.

In some example embodiments, the video identification system 150 may identify a certain location and/or resolve match ambiguities within the identified content based on matching values for the luminance or other display characteristics or features within a frame to similar values within reference fingerprints. For example, the video identification system 150 may identify a block of frames within video content that share similar color characteristics using the operations depicted in method 500, and identify a certain frame within the block of frames based on matching values representing a specific luminance of the certain frame, among other things. Of course, the video identification system 150 may utilize other display characteristics to resolve ambiguities, such as color intensities, color brightness, color contrast, and so on. Thus, in an example embodiment, the second fingerprint may a luminance-based fingerprint derived from luminance in the unknown video content.

Figure 6:
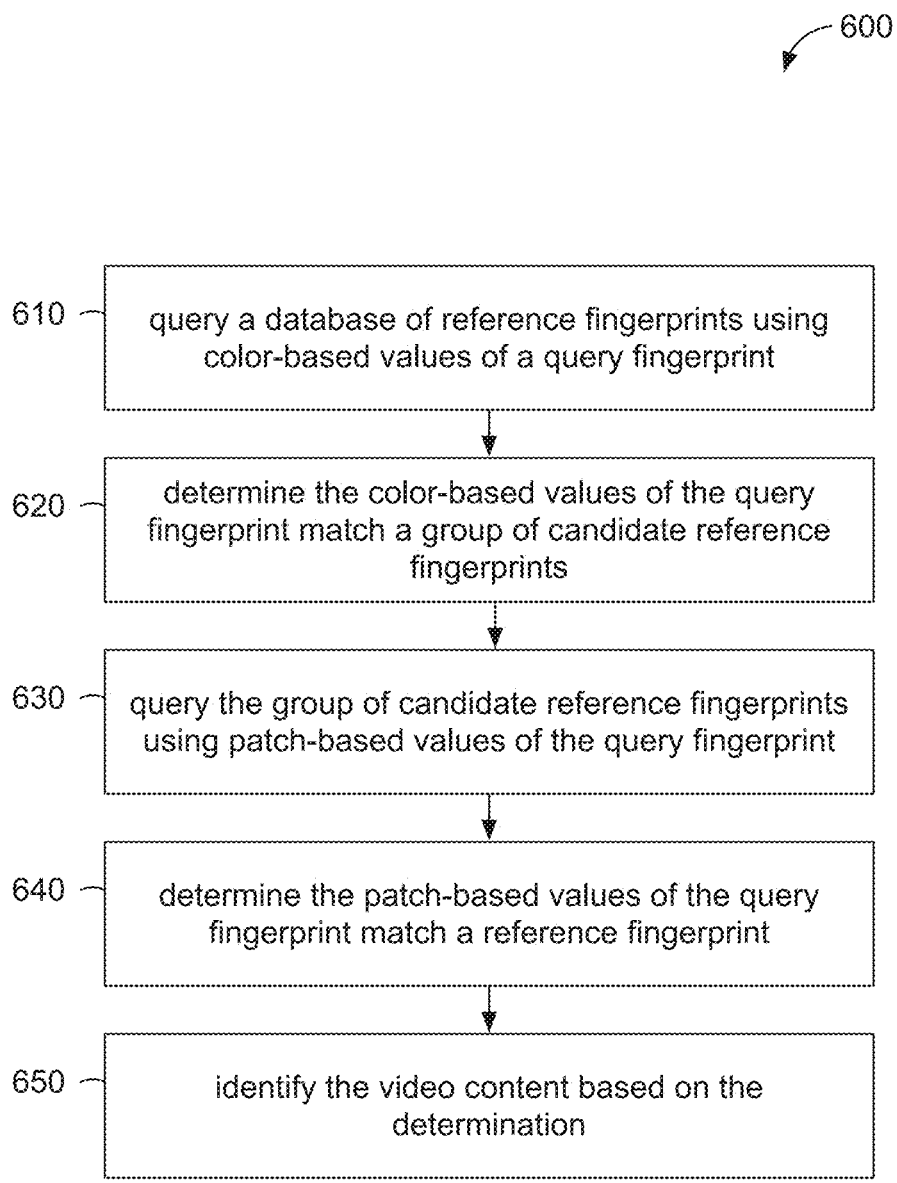
FIG. 6 is a flow diagram of a method, in accordance with an example embodiment, for identifying video content based on patch of a frame of unknown digital video content.

As described herein, in some example embodiments, the video identification system 150 may perform various different queries of databases of fingerprints using one or more values of query fingerprints (color-based and/or based on other features) when identifying video content, among other things. FIG. 6 is a flow diagram of a method 600, in accordance with an example embodiment, for identifying video content based on patch of a frame of unknown digital video content. The method 600 may be performed by the video identification system 150 and, accordingly, is described herein merely by way of example with reference thereto. It will be appreciated that the method 600 may be performed on any suitable hardware.

In operation 610, the video identification system 150 queries a database of reference fingerprints associated with frames of known video content using color-based values of a query fingerprint that is associated with an unknown frame of at least a portion of video content. For example, the index module 230 may access a query fingerprint that includes a value calculated for the multiple patches of the frame of video content using an integral image technique (e.g., a value calculated for multiple Haar-like features of the frame of video content) that includes a value based on multiple colors within the frame of video content.

As described herein, the value based on multiple colors within the frame of video content (or a portion of the frame) may include one or more values quantized for color codes of one or more dominant colors within the frame of video content, such as a single value for 8 color codes, 8 values for 8 color codes, a single value for 16 color codes, 16 values for 16 color codes, and so on.

In operation 620, the video identification system 150 determines the color-based values of the query fingerprint match a group of candidate reference fingerprints. For example, the fingerprint match module 240 may determine that the color-based values match candidate reference fingerprints by determining that a similarity between the color-based values and the reference fingerprints satisfies a predetermined threshold associated with a Tanimoto distance measurement, a Manhattan distance measurement, and/or other distance measurements associated with matching images or other visual-based content.

In operation 630, the video identification system 150 queries the group of candidate reference fingerprints using the patch-based values of the query fingerprint. For example, the index module 230 may query an index of quantized patch values of the known reference fingerprints.

In operation 640, the video identification system 150 determines if the patch-based values of the query fingerprint match a reference fingerprint of the group of candidate reference fingerprints. For example, the fingerprint match module 240 may determine if the query fingerprint matches one of the candidate reference fingerprints by determining that a similarity between the query fingerprint and the candidate reference fingerprint satisfies a predetermined threshold associated with a Tanimoto distance measurement, a Manhattan distance measurement, and/or other distance measurements associated with matching images or other visual-based content.

In operation 650, the video identification system 150 identifies the video content captured at the client device based on the determination that the patch-based values of the query fingerprint match the reference fingerprint. For example, the identification module 250 may identify the name or title of the video content, such as the name of a movie, television program, video clip, video game, and so on.

Thus, in some example embodiments, the video identification system 150 may utilize certain values (e.g., 8 or 16 color values) of a query fingerprint to identify candidate matching fingerprints, and utilize other values (e.g., patch-based values) to select a query fingerprint from the candidate fingerprints. Such processes may reduce loads and query times associated with performing queries of large databases of reference fingerprints, among other things.

Figure 7:
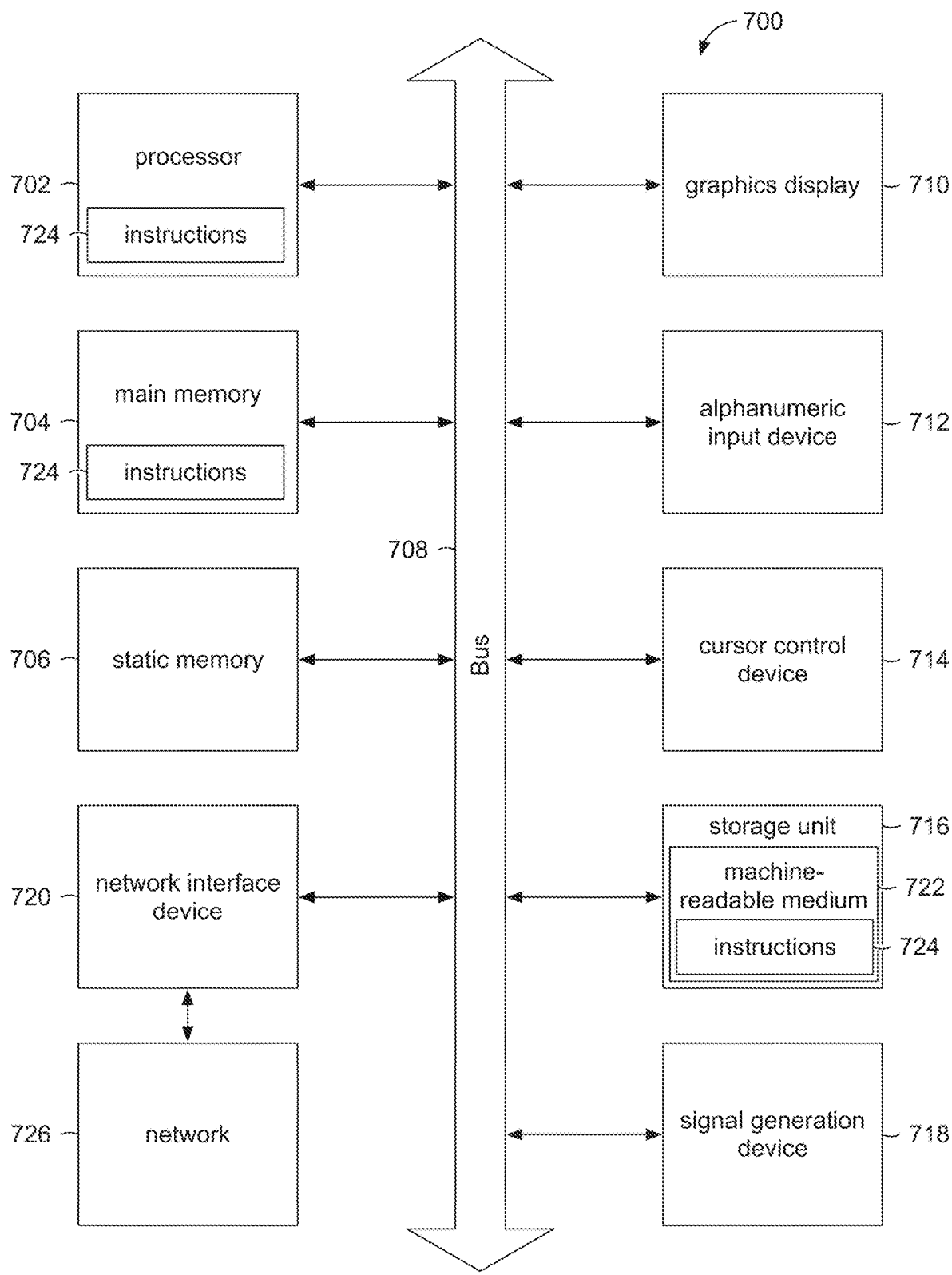
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system within which instructions 724 (e.g., software) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, an STB, a PDA, a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), an LED display, an LCD, a projector, or a CRT). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 (e.g., network 190) via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., software) for execution by the machine (e.g., machine 700), such that the instructions, when executed by one or more processors of the machine (e.g., processor 702), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   determining a first fingerprint for unknown video content, the first fingerprint being a color-based fingerprint based on a set of colors in a frame of the unknown video content;
   determining a second fingerprint for the unknown video content, the second fingerprint being a patch-based fingerprint based on a plurality of patch-based values, wherein determining the second fingerprint comprises:
      dividing the frame of the unknown video content into a plurality of regions;
      selecting a plurality of patches in the frame, wherein selecting the plurality of patches in the frame comprises selecting at least two patches in each region of the plurality of regions; and
      deriving a patch-based value for each respective patch of the plurality of patches to obtain the plurality of patch-based values;
   initiating a query of at least one reference database of reference fingerprints using one of the first fingerprint to obtain a candidate group of fingerprints or the second fingerprint to obtain the candidate group of fingerprints, the candidate group of fingerprints being a subset of the reference fingerprints queried; and
   responsive to the query, initiating a query of the candidate group of fingerprints using the other of the first fingerprint and the second fingerprint to identify at least one query fingerprint, wherein the unknown video content is identified using the at least one query fingerprint.

2. The method of claim 1, further comprising receiving the unknown video content at a media playback device including a hardware processor, the query of the at least one reference database and the query of the candidate group of fingerprints being performed by the hardware processor.

3. The method of claim 2, wherein the at least one reference database is stored in memory of the media playback device.

4. The method of claim 1, wherein initiating the query of the at least one reference database of reference fingerprints comprises sending the first fingerprint and the second fingerprint to a remote server system to execute the query, the at least one reference database being part of the remote server system.

5. The method of claim 1, wherein the at least one reference database comprises:
   a color-based fingerprint database including reference fingerprints that are color-based; and
   a patch-based fingerprint database including reference fingerprints that are patch-based.

6. The method of claim 1, wherein the set of colors includes more than 8 colors.

7. The method of claim 6, wherein the set of colors includes 16 colors.

8. The method of claim 1, wherein the at least one reference database is queried with the first fingerprint to obtain the candidate group of fingerprints, and the candidate group of fingerprints is then queried with the second fingerprint to identify the at least one query fingerprint.

9. The method of claim 1, wherein the at least one reference database is queried with the second fingerprint to obtain the candidate group of fingerprints, and the candidate group of fingerprints is then queried with the first fingerprint to identify the at least one query fingerprint.

10. The method of claim 1, wherein the color-based fingerprint is based on a plurality of color-based values, wherein each color-based value is determined for a respective color in the set of colors.

11. The method of claim 1, wherein initiating the query of the at least one reference database using one of the first fingerprint or the second fingerprint uses a fingerprint defined by a lower number of bits than that used to query the candidate group.

12. The method of claim 1, wherein initiating the query of the at least one reference database comprises querying the at least one reference database of reference fingerprints using the color-based fingerprint.

13. The method of claim 12, wherein querying the at least one reference database using the color-based fingerprint comprises determining that a similarity between the color-based fingerprint and the reference fingerprints satisfies a predetermined threshold associated with vector distance measurement.

14. The method of claim 1, wherein the at least two patches in each region of the plurality of regions include a patch of left-right features in the region and a patch of top-bottom features in the region.

15. The method of claim 1, wherein the plurality of regions is defined by a 4×3 grid, and wherein selecting the plurality of patches in the frame comprises selecting a predetermined number of patches in the frame.

16. A computer comprising:
   one or more hardware processors; and
   memory including instructions that, when executed by the one or more processors, cause the computer to perform operations comprising:
      determining a first fingerprint for unknown video content, the first fingerprint being a color-based fingerprint based on a set of colors in a frame of the unknown video content;
      determining a second fingerprint for the unknown video content, the second fingerprint being a patch-based fingerprint based on a plurality of patch-based values, wherein determining the second fingerprint comprises:
         dividing the frame of the unknown video content into a plurality of regions;
         selecting a plurality of patches in the frame, wherein selecting the plurality of patches in the frame comprises selecting at least two patches in each region of the plurality of regions; and
         deriving a patch-based value for each respective patch of the plurality of patches to obtain the plurality of patch-based values;
      initiating a query of at least one reference database of reference fingerprints using one of the first fingerprint to obtain a candidate group of fingerprints or the second fingerprint to obtain the candidate group of fingerprints, the candidate group of fingerprints being a subset of the reference fingerprints queried; and responsive to the query, initiating a query of the candidate group of fingerprints using the other of the first fingerprint and the second fingerprint to identify at least one query fingerprint, wherein the unknown video content is identified using the at least one query fingerprint.

17. The computer of claim 16, wherein the computer is a media playback device including the at least one reference database, the media playback device configured to receive the unknown video content and query the at least one reference database and the candidate group of fingerprints to identify the at least one query fingerprint.

18. The computer of claim 16, wherein the at least one reference database is queried with the second fingerprint to obtain the candidate group of fingerprints, and the candidate group of fingerprints is then queried with the first fingerprint to identify the at least one query fingerprint.

19. A non-transitory computer-readable storage medium embodying instructions which, when executed by a machine, cause the machine to perform operations comprising:

determining a first fingerprint for unknown video content, the first fingerprint being a color-based fingerprint based on a set of colors in a frame of the unknown video content;

determining a second fingerprint for the unknown video content, the second fingerprint being a patch-based fingerprint based on a plurality of patch-based values, wherein determining the second fingerprint comprises:

dividing the frame of the unknown video content into a plurality of regions;

selecting a plurality of patches in the frame, wherein selecting the plurality of patches in the frame comprises selecting at least two patches in each region of the plurality of regions; and deriving a patch-based value for each respective patch of the plurality of patches to obtain the plurality of patch-based values;

initiating a query of at least one reference database of reference fingerprints using one of the first fingerprint to obtain a candidate group of fingerprints or the second fingerprint to obtain the candidate group of fingerprints, the candidate group of fingerprints being a subset of the reference fingerprints queried; and responsive to the query, initiating a query of the candidate group of fingerprints using the other of the first fingerprint and the second fingerprint to identify at least one query fingerprint, wherein the unknown video content is identified using the at least one query fingerprint.

20. The non-transitory computer-readable storage medium of claim 19, wherein the machine is a media playback device, further comprising instructions to receive the unknown video content at the media playback device including a hardware processor, and query the at least one reference database and the candidate group of fingerprints using the hardware processor.

\* \* \* \* \*